April 14, 1970 W. RICHARDS 3,506,322
FABRICATED FRAME AND HOUSING
Filed Oct. 31, 1967 3 Sheets-Sheet 1
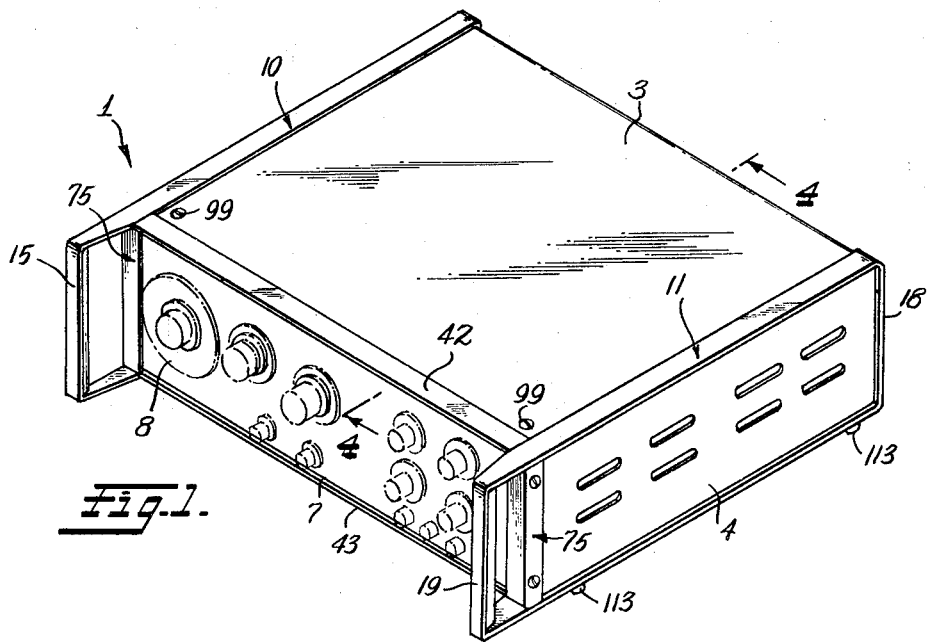
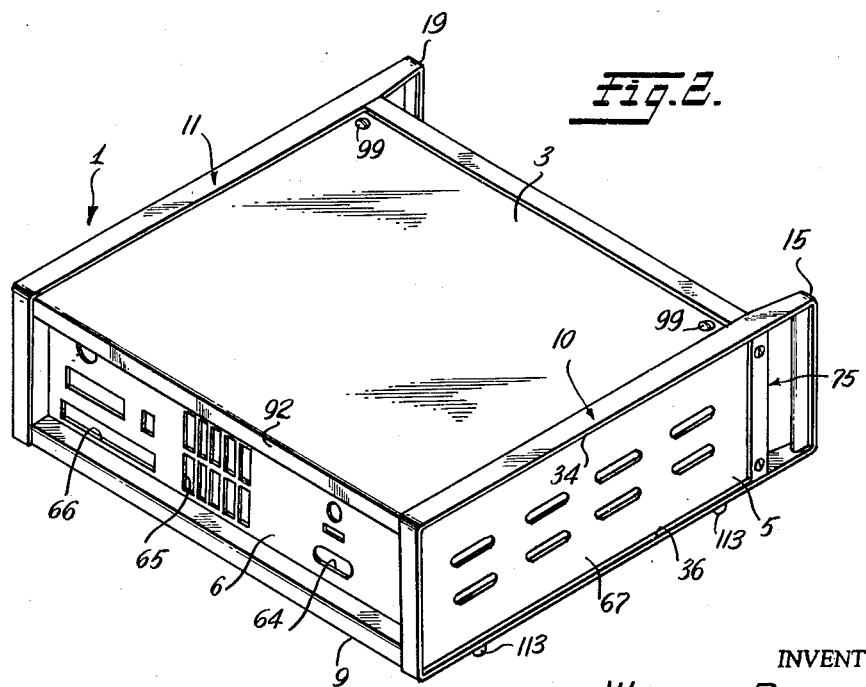
INVENTOR
WILLIAM RICHARDS
BY Arnold, Roylance, Kruger & Durkee
ATTORNEYS

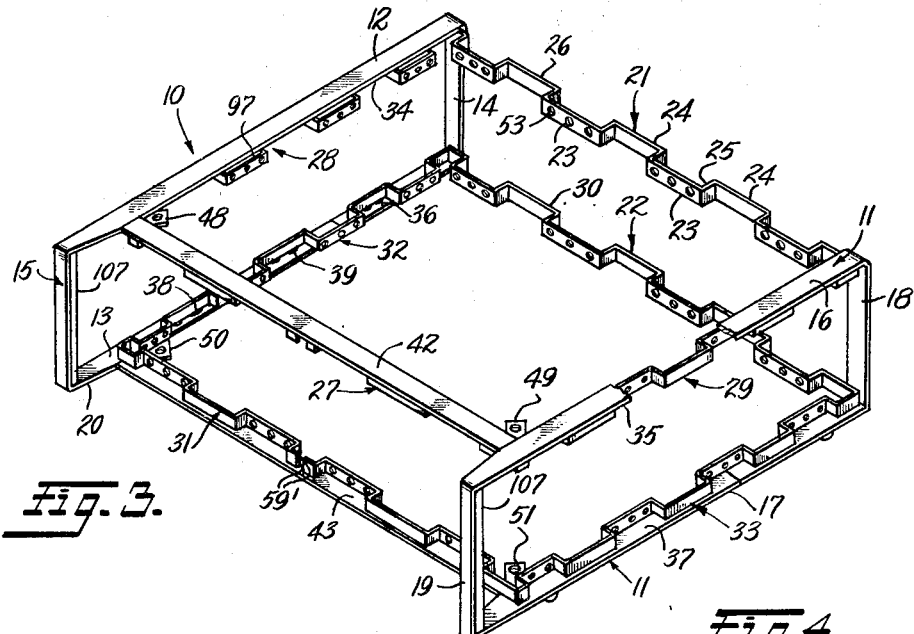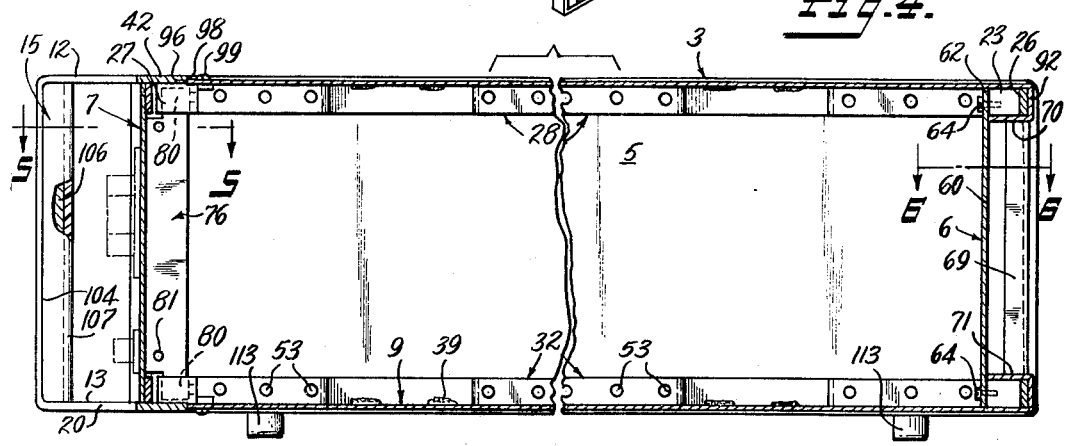

April 14, 1970 W. RICHARDS 3,506,322
FABRICATED FRAME AND HOUSING
Filed Oct. 31, 1967 3 Sheets-Sheet 3
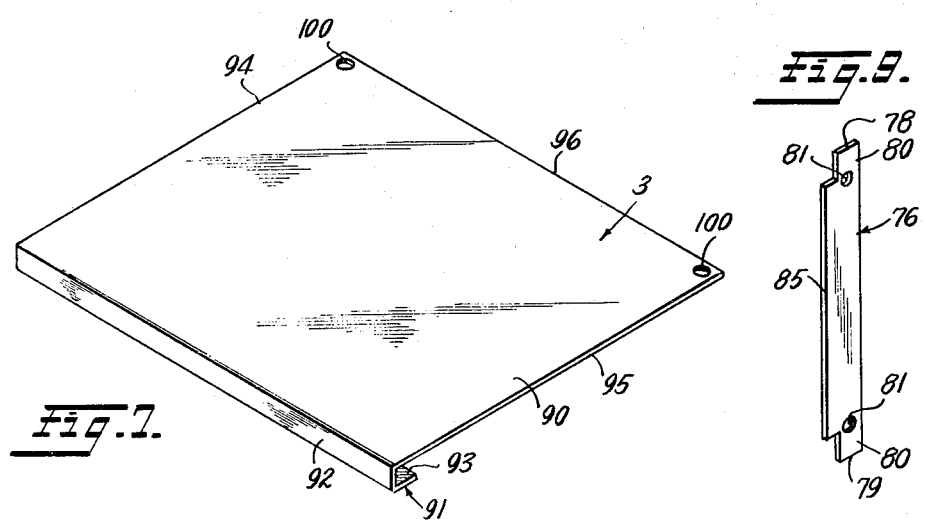
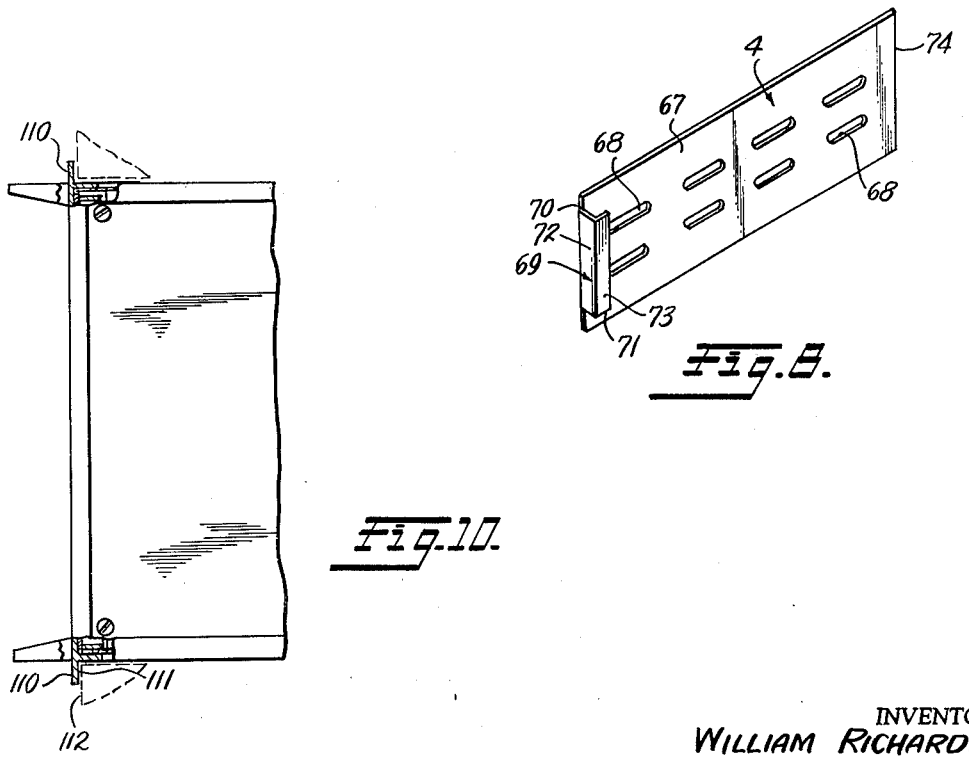
INVENTOR
WILLIAM RICHARDS
BY *Arnold, Roylance, Kruger & Durkee*
ATTORNEYS United States Patent Office 3,506,322
Patented Apr. 14, 1970

3,506,322
FABRICATED FRAME AND HOUSING
William Richards, Medway, Mass., assignor to Weston Instruments, Inc., Newark, N.J., a corporation of Delaware
Filed Oct. 31, 1967, Ser. No. 679,469
Int. Cl. A47b *87/02;* H05k *7/18*
U.S. Cl. 312—108                                       11 Claims

ABSTRACT OF THE DISCLOSURE

A fabricated instrument housing formed from a pair of upright spaced apart rectangular loops which are connected together by a pair of horizontal spaced apart loops which are welded respectively to the upper and lower horizontal legs of the upright loops. The horizontal loops have undulating or corrugated sides which provide beam strength to resist bending as a result of vertical loads from equipment mounted in the housing. The upright loops have vertical front legs which extend forwardly of the front panel of the housing and provide handles. A unique interlocking arrangement between top, bottom, rear and side panels eliminates many fasteners previously required. An upright brace and bracket at the front corners of the horizontal loops connect the front edges of the side panels and front cover panel to the housing. The brace and bracket also provides additional vertical strength to resist deformation of the housing due to vertical loads created when instruments are stacked one on the other.

---

This invention relates to a fabricated frame of unique construction.

More particularly, the invention relates to a frame having particular utility as the frame for a unique housing for electronic and other instruments. In the past, instrument casings such as used for electronic gear of various types have customarily included a frame to which sheet metal panels are attached to provide the instrument casing or housing. In some instances, the frame has been fabricated from extrusions of various types, and it is also known to use cast frames which may be formed by die casting. These frames, as used in the past, do form a structurally strong housing but cannot readily be made economically in various sizes.

In the case of castings, where frames of various sizes are required, a different mold is required for the frame of each different size housing. Since it is desirable to form housings of various widths, heights, and lengths (as measured from front to back), numerous expensive molds must be provided where any of these dimensions are varied.

In an attempt to overcome these difficulties, some fabricated sheet metal housings have been devised in the past, using various arrangements of angle irons and metal panels, with the angles and panels so designed and constructed that they cooperate to provide at least some of the desired structural rigidity. However, without using massive framework, the sheet metal-angle frame constructions have not provided the required strength, and in addition, the prior known sheet metal-angle constructions have an appearance which leaves much to be desired.

The basic shortcoming of the constructions discussed above is that they are either expensive to manufacture, as in the case of a housing with a die cast frame, especially when only a small number of housings of a certain size are required, or lack the structural rigidity and appearance requirements for expensive electronic equipment, as is the case with the sheet metal frame construction.

Applicant, with the unique fabricated frame construction and housing of this invention, has alleviated many of the shortcomings of the prior-art housings. Applicant's housing includes a pair of parallel, spaced apart vertical loops and a pair of parallel, spaced apart horizontal loops which are joined respectively to the upper and lower legs of the vertical loops and extend between the vertical loops. These horizontal and vertical loops form the basic framework which supports the sheet metal covers which enclose the instrument housing.

Each vertical loop is formed from a single piece of strip material which is readily bent to the desired rectangular configuration and there is only a single joint where the opposite ends of the strip abut each other. Likewise, each horizontal loop is formed from a single strip of material which advantageously is corrugated so that the horizontal loops, when connected to the vertical loops, provide substantial beam strength for the horizontal legs of the vertical loops. Thus, to fabricate housings of many sizes, it is merely necessary to stock flat strip material for the vertical loops and corrugated strips for the horizontal loops. Then, frames for housings of various dimensions can be readily fabricated merely by cutting the strips to length, the strips for the vertical loops at four corners and the strips for the horizontal loops at four corners. Advantageously, automatic welding equipment can be used to tack weld the horizontal loops to the legs of the vertical loops where housings are mass produced, or hand welding equipment can be used if production is on a small scale. Then, the cover panels are cut to the desired size to fit the frame.

Some additional unique features of this invention include the interlocking arrangement between the top and bottom cover panels which requires only several threaded fasteners and thus removal of these panels can be readily and quickly accomplished. Likewise, the side and front panels are uniquely held in place by a bracket and angle iron which forms an effective clamp and, in addition, provides vertical strength for the housing because the side panels engage the oppositely facing surfaces of the legs of the vertical loops.

By virtue of the removable clamp arrangement including the bracket and angle iron located at the front corners of the horizontal loops, substantial space is provided which permits removal of components located at the front corners without the need for disturbing other components which may be closely packed in the housing. In addition, in the preferred embodiment which will subsequently be described in detail, handles are formed on the front vertical portions of the vertical loops to facilitate carrying the instrument from one location to another, the handles extending forwardly of the front face of the instrument in the customary manner.

In view of the foregoing, an object of this invention is to provide a fabricated frame which can be produced economically where only a few frames are required and can also be mass produced economically where large numbers of frames of the same size are required.

Another object is a frame for an instrument housing which can be readily fabricated, which is economical to produce either on a small or large scale, and which is quite attractive as well as structurally strong.

Another object is a housing or casing including a unique structurally strong fabricated frame which is simply formed from a pair of vertical loops and a pair of horizontal loops connected together.

A further object is a fabricated frame formed from pairs of horizontal and vertical loops in which the horizontal loops have corrugated sides and where a bracket and angle arrangement at the front corners of the horizontal loops facilitate connecting front and side panels to the frame.

Other objects include the unique manner of connecting the several cover panels to the frame as well as the construction of and mode of providing handles and enhancing structural rigidity of a housing embodying the frame and cover panels.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a pictorial view showing the front of the housing of this invention;

FIG. 2 is a pictorial view showing the rear of the housing of this invention;

FIG. 3 is a pictorial view corresponding to that of FIG. 1 showing the frame for the housing of FIG. 1;

FIG. 4 is a side elevational view in section taken along lines 4—4 of FIG. 1;

FIG. 5 is an enlarged partial plan view in section taken along lines 5—5 of FIG. 4;

FIG. 6 is an enlarged partial plan view in section taken along lines 6—6 of FIG. 4;

FIG. 7 is a pictorial view of the top panel of the housing;

FIG. 8 is a pictorial view of a side panel of the housing;

FIG. 9 is a pictorial view of a clamp bracket for the housing; and

FIG. 10 is a plan view of the housing with portions thereof removed showing an embodiment of the housing particularly adapted for rack installations.

Referring now to the drawings in detail and particularly to FIGS. 1-3, there is shown a housing 1 in accordance with this invention, the housing including a frame 2 and a plurality of cover panels which close the several openings of the frame. As will be observed with reference to FIGS. 1 and 2, a top cover panel 3 extends across and closes the top of the frame, side panels 4 and 5 extend across and close the sides of the frame, a rear panel 6 extends across the rear of the frame between side panels 4 and 5, and a front panel 7 extends across the front of the frame and has openings therein through which the control shafts of electrical components mounted within the housing extend and on which control knobs 8 are mounted. As shown at FIGS. 2 and 4, a bottom panel 9 extends across and closes the bottom of the housing.

As shown at FIGS. 3-5, frame 3 is comprised of a first rectangular loop 10 fabricated from a strip of strong bendable material which is advantageously stainless steel because of its high strength and attractive appearance. A second rectangular loop 11 is identical to loop 10 and extends in spaced parallel relation to loop 10. In the preferred embodiment shown and described, loops 10 and 11 are vertical and are horizontally elongated.

Loop 10 includes a first or upper leg 12, a second or lower leg 13 parallel to leg 12, a first or rear arm 14 and a second or front arm 15, arms 14 and 15 being parallel with each other and joining the legs at their respective ends at right angle bends in the strip of material from which loop 10 is formed. Second loop 11 is identical to first loop 10 and includes a first or upper leg 16, a second or lower leg 17, a first or rear arm 18 and a second or front arm 19. The respective arms and legs of the first and second loops are of the same length and are coplanar with each other. With reference to FIGS. 5 and 6, it will be observed that second arm 15 is narrower than first arm 14 and that the front portion of leg 13 has its inner edge 20 angled outwardly to smoothly merge with the second arm. The front portions of legs 13, 16 and 17 are similarly angled. These angled edges provide an outwardly flared arrangement which improves access to control knobs 8 and also enhances the appearance of the assembled housing.

First loop 10 is rigidly connected to second loop 11 by a third loop 21 and a fourth loop 22. Loop 21 is formed from a single narrow strip of metal of uniform thickness and height which is uniformly corrugated. The strip from which loop 21 is formed has a plurality of oppositely directed right angle bends therein to provide a plurality of flat rectangular spaced apart inner portions 23 aligned with each other and a plurality of flat rectangular spaced apart outer portions 24, also aligned with each other, the inner portions being joined to the outer portions by short connecting legs 25. Fourth loop 22 is formed from a strip of corrugated metal identical to the strip from which third loop 21 is formed.

Loop 21 has a rear leg 26, a front leg 27 in spaced parallel relation to the rear leg, and side legs 28 and 29 integral with and connecting the respective ends of the front and rear legs at right angle bends. Fourth loop 22 is identical to third loop 21 and has a rear leg 30, a front leg 31 and side legs 32 and 33. Advantageously, the right angle bends formed in third loop 21 and fourth loop 22 are each formed in one of the outer portions 24 of the corrugations for purposes which will subsequently be explained in detail.

The upper edge of side leg 28 of loop 21 lies against the inside surface 34 of leg 12 and the upper edge of side leg 29 lies against the inside surface 35 of leg 16. Similarly, the lower edges of side legs 32 and 33 of fourth loop 22 lie against the respective inside surfaces of legs 13 and 17. The side legs of the third and fourth loops are each welded to the respective legs of the first and second loops along only outer portions 24 of the corrugations. Preferably, the welding is accomplished by tack welding at several points such as 38 and 39 along the length of each outer portion 24 of the corrugations. As is apparent with reference to FIGS. 5 and 6, inner portions 23 of the corrugations of side leg 32 extend inwardly of inner edge 40 of leg 13 and outer portions 24 of leg 32 are spaced inwardly from outer edge 41 of leg 13. The other side legs of the third and fourth loops are similarly connected to the legs of the first and second loops with the corrugations similarly positioned.

Cross straps 42 and 43 extend between loops 10 and 11. Cross strap 42 has a width and thickness the same as the width and thickness of the body of legs 12 and 16, and thus when positioned on leg 27 of third loop 21, cross strap 42 has its outer surface coplanar with the outer surfaces of legs 12 and 16. Cross strap 43 is similarly dimensioned and extends across the bottom edge of leg 31 between legs 13 and 17 of the first loops. It will be noted from FIG. 5 that the front edge 44 of cross strap 43 is precisely aligned with corner 45 formed at angled edge 20. Legs 27 and 31 of the third and fourth loops are secured to cross straps 42 and 43 by welding, the welding taking the form of tack welds such as the tack welds 46 shown at FIG. 5 for leg 31 and cross strap 43. Welds 46 are preferably formed only along the inside surfaces of outer portions 24 of the corrugations of leg 31 and inner portions 23 corrugations of the leg extend inwardly of the rear edge 47 of cross strap 43. The arrangement is identical for cross strap 42 and leg 27. Short tabs 48–51 are welded one to each end of cross straps 42 and 43, each tab extending diagonally and having an opening therein to receive a threaded fastener which holds the top and bottom cover panels in position.

In the manufacture of frame 3, loops 10 and 11 are first formed. These loops are formed by selecting a single strip of material of the desired length and providing four right angle bends in the strip so that the end edges 52 of each member abut at a location along the lower leg 13 or 17 of a loop, and are offset toward the rear of the housing where these abutting ends, which are welded together, are somewhat hidden. Then, the third and fourth loops are formed by providing four right angle bends in the corrugated material for each loop. Cross straps 42 and 43 are then selected and cut to proper length, if necessary. The loops and cross straps are then positioned in a suitable jig and welded together.

With reference to FIG. 3, it will be observed that legs 21 and 22 of the third and fourth loops provide cross members which secure the ends of loops 10 and 11 adjacent rear legs 14 and 18 rigidly together. Similarly, legs 27 and 31 of the third and fourth loops extend between first and second loops 10 and 11 adjacent the front of the frame. Cross straps 42 and 43 to which legs 27 and 31 are secured, respectively, complete the cross member assembly for the front of the frame. It will be noted with reference to FIG. 1 that cross straps 42 and 43 as well as front panel 7 are spaced from front arms 15 and 19 a distance sufficient to permit a user of the housing to grasp these arms which provide handles as will be subsequently described in detail.

Inner portions 23 of the corrugations of the third and fourth loops are each provided with several horizontally aligned openings 53 which are provided to facilitate mounting rear panel 6 as well as electrical components which will be packed in the housing with screws or rivets.

In the preferred embodiment shown and described herein, the distance between the centers of like corrugations is four inches. It will be noted, however, with reference to FIGS. 5 and 6 that corner bends of third loop 21 or fourth loop 22 are formed at an outside portion 24 of the corrugations. As shown at FIG. 5, the outer portion 24 of the corrugation, which is bent from corner 54, has a transversely extending part 55 which is substantially longer than the short part 56 that extends along the length of the leg 13. By forming the bend of front corner 54 in outer portion 24 of the corrugation, connector leg 25 cooperates with portions 55 and 56 to form a U-shaped pocket 57. An identical U-shaped pocket, vertically aligned with pocket 57, is formed at the bend between legs 27 and 28 of the third loop and a mirror image shaped pocket is formed between legs 27 and 29 of the third loop as well as between legs 31 and 33 of the fourth loop.

The rear corner between legs 30 and 32 of fourth loop 22 is also formed with a pocket 58 therein which is of a size different from the pocket 57, since outer member 24 at corner 59 adjacent pocket 28 is bent at a location different from the bend for pocket 58. The pocket in third loop 21 which is immediately above pocket 58 is identical to pocket 58, and the two pockets between the side and rear of the legs of the third and fourth loops are mirror images of pocket 58. By bending the outer portions 24 of the corrugations of third loop 21 and fourth loop 22 so that the pockets are precisely aligned one above the other and of identical configuration, it is assured that each inner portion 23 of a corrugation of third loop 21 is vertically aligned with inner portion 23 of a corrugation of fourth loop 22, and outer portions 24 of the corrugations of the third and fourth loops are likewise vertically aligned and coplanar with each other for each of the respective legs of the third and fourth loops. It is to be appreciated that if it is desired to slightly change either the width of frame 3 or the depth of the frame as measured from front to back, such slight changes can be accomplished merely by providing the corner bends in the outer portions 24 of the corrugations of the third and fourth loops at slightly different positions. Since legs 27 and 31 are supported by and secured to cross straps 42 and 43, respectively, end edges 59' at the centers of these legs need not be joined together but may be spaced apart as shown at FIG. 3 to permit varying the length of the corner pockets while maintaining the third and fourth loops rectangular.

As shown at FIGS. 2, 4 and 6, rear panel 6 includes a rectangular body portion 60 of thin sheet material with sides 61 bent at right angles to body 60. Rear panel 6 is provided with punched openings spaced only slightly from its top and bottom edges 62 and 63 to receive screws 64 which are used to fasten rear panel 6 to legs 26 and 30 via openings 53 in the inner portions of the corrugations of these legs. As shown at FIG. 4, the panel engages the surfaces of inner portions 23 of the corrugations of legs 26 and 30 and extends along the height of the legs. The panel is secured to the legs with ends 61 extending rearwardly toward the respective rear arms 14 and 18. It will be observed with reference to FIG. 6 that end 61 extends into pocket 58. This end also extends into the pocket vertically above pocket 58 and end 61 (not shown) at the other side of the rear panel extends into the pockets at that other side. With reference to FIG. 2, it will be noted that the rear panel is provided with suitable openings such as openings 65, 66 to provide for mounting suitable connector plugs and for ventilation of the elecrtonic gear mounted in the housing.

With reference to FIG. 8, there is shown side panel 4. Side panel 4 has a rectangular body portion 67 with two rows of aligned ventilating openings 68 formed therein. End 69 of the panel is hook-shaped and of lesser height than body 67, hook-shaped end 69 having upper and lower edges 70 and 71. The end is formed by bending leg 72 at right angles to the plane of body 67 and then bending leg 73 at right angles to leg 72 so leg 73 extends parallel with body 67. Hook-shaped end 69 is at the rear of side panel 4 and at the opposite end is front edge 74. The side panel 5 shown at FIG. 6 is identical to side panel 4 and is merely side panel 4 rotated 180° about a horizontal axis. Side panel 5 also has a hook-shaped end 69 comprised of legs 72 and 73 with upper and lower edges 70 and 71. With reference to FIG. 2, it will be noted that body 67 of side panel 5 has a vertical height substantially equal to the distance between inside surfaces 34 and 36 of the legs of first loop 10. Thus, when panel 5 is positioned between the legs with the inside face of the panel engaging the outer surfaces of outer portions 24 of the corrugations, as shown in FIGS. 5 and 6, the side panel adds vertical strength to second loop 11. Side panel 4 is similarly dimensioned to provide vertical strength for first loop 10. The rear of side panels 4 and 5 are held in position on the frame by the rearwardly facing ends 61 of rear panel 6. It will be noted from FIG. 6 that hook-shaped end 69 extends inwardly of the outer portion 24 of the corrugation and hooks over end 61 of rear panel 6. To attach side panels 4 and 5 to the frame, it is merely necessary to loosen several of the screws which hold rear panel 6 in position adjacent ends 61 whereupon the rear panel can be flexed to the dotted line position 74 of FIG. 6 and the rear of the side panel can then be moved inwardly toward the frame and the screws tightened to lock the side panels with ends 61. The front of side panels 4 and 5 are held in position by a bracket and clamp assembly 75, one at each of the front corners of the frame. The bracket assembly includes a bar 76 and a corner angle 7. Bar 76 has a height between its upper edge 78 and lower edge 79 which is substantially equal to the distance between the upper and lower legs of the first and second loops. The ends of bar 76 are cut away to provide reduced width tips 80 to fit in pocket 57 at corner 54. Bar 76 has threaded openings 81 adjacent the opposite ends thereof but spaced a sufficient distance from ends 78 and 79 to clear the edges of the corrugated legs of the third and fourth loops. Corner angle 77, which is preferably formed of stainless steel because of its attractive surfaces, has a vertical height equal to the spacing between the legs of the first and second loops so that corner angle 77 adds additional vertical strength to the frame when positioned as shown at FIG. 5. For purposes of appearance, the front leg 82 of the angle is equal in width to the width of the wider part of the leg 13 of the first loop and has its front face coplaner with front edge 44 of cross strap 43. A similar dimensional relationship exists between the legs and angle at each front corner.

A distinct advantage of the corner angle and bracket arrangement is that bracket 76 and angle 77 are removably held in position at the front corners of the housing by the screws 83. Thus, if it is necessary to remove large components from within the housing and it is not desired to remove other components in order to have access to them, it is merely necessary to unthread screws 83 completely from bar 76 whereupon the corner angle is completely free to be removed, and one can then tilt one end of bar 76 out of the pocket and remove same through the side or front of the frame.

With reference to FIG. 5, leg 84 of angle 77 extends over front edge 74 of panel 5 and clamps the front edge between the inside surface of the leg and the outside surface of portions 24 of the corrugations in the corner. The inside surface of leg 82 of angle 77 cooperates with the front end 85 of bar 76 to clamp the side of front panel 7. While not shown, it is to be understood that the opposite side of rectangular front panel 7 is formed from sheet metal and is clamped by a bracket and clamp assembly of similar construction to clamp 75. The height of front panel 7 is equal to the distance between the facing surfaces of cross straps 42 and 43 so the front panel adds additional vertical support to the housing. It will be noted with reference to FIGS. 5 and 6 that the distance between side edge 41 of leg 13 and outer surface 87 of outer portions 24 of the corrugations is greater than the thickness of side panel 5. Likewise, the distance between outer surface 88 of the outer portion 24 of the corrugations of front leg 31 to front edge 44 of cross strap 43 is greater than the thickness of front panel 7 so that a pleasing and esthetically attractive recessed effect is obtained at side panels 4 and 5 as well as at front panel 7, as shown in FIGS. 1 and 2.

As shown in FIG. 7, top panel 3 is rectangular and formed from sheet metal. Top panel 3 has a body portion 90 with its rear edge bent to provide a hook-shaped end 91. The hook-shaped end includes a leg 92 of the same width as body 90 and which extends at right angles to the body, and a leg 93 that extends parallel to body 90. The width of top panel 3 as measured between side edges 94, 95 is equal to the distance between the inside edges of legs 12 and 16 of the first and second loops respectively. In addition, the distance between the inside surface of leg 93 and body 90 of top panel 3 is only slightly greater than the vertical height of rear leg 26 of third loop 21. Thus, when hook-shaped end 91 is hooked around rear leg 26 and slid toward the front of the housing, leg 93 engages under the rear leg and retains one end of top panel 3 against vertical displacement. As previously pointed out, inner portions 23 of the corrugations extend inwardly of the legs of the first and second loops. Thus, top panel 3 is supported at spaced apart locations by the upwardly facing edges 97 of the inner portions 23 of the corrugations. The length of top panel 3 from leg 92 to front edge 96 is such that the inside surface of leg 92 (FIG. 4) abuts the outside surface of outer portion 24 of the corrugations of leg 26 when front edge 96 engages rear edge 98 of cross strap 42. The front edge of cover panel 3 is hold in position by screws 99 which pass through openings 100 in the cover panel and extend into the openings 101 of tabs 48 and 49. Front edge 96 of top panel 3 is further supported along its length by the edges of portions 23 of the corrugations of leg 27 which extend rearwardly of edge 98 of cross strap 42.

Bottom panel 9 is identical to top panel 3 and the dimensional relationships between the hook-shaped end and rear leg 22 are the same. Hence, bottom panel 9 is fitted to and held to the housing in the same manner as described for panel 3, but with screws that thread into the openings in tabs 50 and 51.

As previously described, second arms 15 and 19 are located in front of front panel 7. Arms 15 and 19 form portions of handles to facilitate handling the housing. Welded to inside surface 104 of handle 15 (FIG. 5) is a centrally located strip of stainless steel which is rectangular as viewed in cross-section. The strip extends the distance between legs 12 and 13 of the first loop. To cushion the handle somewhat and to avoid the effects of sharp edges of the strip 106, a hand grip 107 in the form of a U-shaped strip of nylon or other flexible resilient material is slipped over strip 106 with the end edges of hand grip 107 abutting the inside face of second arm 15. The handle and hand grip at second arm 19 is identical to that described for second arm 15.

FIG. 10 shows a second embodiment of the corner structure of the housing of this invention. As shown, the angles 77, previously described with regard to FIG. 5, are replaced with T-shaped members having outwardly projecting sides 110. Sides 110 have flat abutment surfaces 111 which engage front faces 112 of the rack to limit the distance that the housing can be pushed into a shelf of the rack. Since corner angle 77 is readily removable, a corner angle with the projecting side 110 can be installed at any time after assembly of the housing if the housing is later used with a rack. Feet 113 are connected to legs 13 and 17 to support the housing during use.

While a preferred embodiment has been shown and described, it is to be understood that numerous changes can be made in the construction shown and disclosed herein without departing from the intended scope of this invention. For example, third loop 21 and fourth loop 22 can be differently bent so that the end edges 59' of these loops either meet each other or lie along a leg of the frame different from cross strap 43. It is to be further understood that numerous changes can be made in the construction shown and disclosed herein without departing from the intended scope of this invention. For example, third loop 21 and fourth loop 22 can be differently bent so that the end edges 59' of these loops either meet each other or lie along a leg of the frame different from cross strap 43. It is to be further understood that numerous changes can be made in the embodiment described without departing from the scope of the invention as defined in the appended claims.

I claim:
1. A fabricated frame comprising:
a first fabricated loop;
a second fabricated loop spaced from said first loop, said loops each having first and second spaced apart legs and first and second arms extending between said legs;
frame means extending between said loops to rigidly maintain said loops in spaced relation to each other with the arms and legs of the first loop aligned with the arms and legs of the second loop, said means comprising, first cross member means extending transversely of said loops and secured thereto adjacent the first arm of each loop, and second cross member means extending transversely of said loops and secured thereto at a location spaced from said first cross member means, one arm, one leg, and at least one additional one of the remaining arms and legs of said first and second loops being integral with each other and formed from a single strip of bendable metal, said first and second cross member means each comprising a first cross member secured to the first leg of each of said loops, and a second cross member secured to the second leg of each of said loops; and
wherein said first and second cross members of said first and second cross member means each include corrugated strips, said strips each including por- tions extending along the legs of said loops to which the strips are secured.

2. A frame according to claim 1 wherein said first and second cross members of said second cross member means further include first and second flat straps, said first strap extending between and abutting facing sides of said first legs of said loops and said second strap extending between said second legs of said loops.

3. A fabricated frame comprising:
a first fabricated loop;
a second fabricated loop spaced from said first loop said loops each having first and second spaced apart legs and first and second arms extending between said legs;
frame means extending between said loops to rigidly maintain said loops in spaced relation to each other with the arms and legs of the first loop aligned with the arms and legs of the second loop, said means comprising, first cross member means extending transversely of said loops and secured thereto adjacent the first arm of each loop, and second cross member means extending transversely of said loops and secured thereto at a location spaced from said first cross member means; and
wherein said second arms of said loops are spaced from said second cross member means in a direction away from said first cross member means to provide handles for said frame, said handles each being integrally formed with and by the extensions of the respective loop portions including the second arm members extending between the first and second leg members.

4. A frame according to claim 3 wherein said first leg, second arm, and second leg of each of said loops are formed from a single flat strip of bendable metal; said second arms extend generally perpendicularly between said first and second legs of each loop; and which further includes a pair of hand grips support means and a pair of hand grips; said hand grip support means each including a narrow support strip of material secured to each of said second arms and extending in a direction along the length of the arms; said hand grips each being elongated and having a U-shaped slot engageable over a support strip.

5. A fabricated frame for an instrument housing comprising:
a first fabricated loop; a second fabricated loop spaced from said first loop, said loops each having first and second spaced apart legs and first and second arms extending between said legs;
frame means extending between said loops to rigidly maintain said loops in spaced relation to each other with the arms and legs of the first loop aligned with the arms and legs of the second loop, said means comprising, first cross member means extending transversely of said loops and secured thereto adjacent the first arm of each loop, and second cross member means extending transversely of said loops and secured thereto at a location spaced from said first cross member means; and
wherein the frame is a frame for an instrument housing, said first and second loops are vertical, said first arms of said loops are at the rear of the housing, and said first cross member means includes a first elongated cross member extending horizontally between said first legs of said loops and adjacent the rear of the housing, and a second elongated cross member extending horizontally between said second legs of said loops and adjacent the rear of the housing;
a rectangular top cover panel extending between said second cross member means and said first cross member and lying between said first legs of said loops;
a rectangular bottom cover panel extending between said second cross member means and said second cross member and lying between said second legs of said loops; said top panel having a hook shaped end engaged over and extending partially around said first cross member to maintain the portion of the panel adjacent said hook shaped end against vertical movement; said bottom cover panel having a hook shaped end engaged over and extending partially around said second cross member to maintain the portion of said bottom panel adjacent said hook shaped end against vertical movement; and
means on said frame adjacent the opposite end of each panel to secure said opposite ends to said frame adjacent said second cross member means.

6. A fabricated frame for an instrument housing comprising:
a first fabricated loop; a second fabricated loop spaced from said first loop, said loops each having first and second spaced apart legs and first and second arms extending between said legs;
frame means extending between said loops to rigidly maintain said loops in spaced relation to each other with the arms and legs of the first loop aligned with the arms and legs of the second loop, said means comprising, first cross member means extending transversely of said loops and secured thereto adjacent the first arm of each loop, and second cross member means extending transversely of said loops and secured thereto at a location spaced from said first cross member means; and
wherein the frame is a frame for an instrument housing, said first and second loops are vertical, said first arms of said loops are at the rear of the housing, and said first cross member means includes a first elongated cross member extending horizontally between said first legs of said loops and adjacent the rear of the housing, and a second elongated cross member extending horizontally between said second legs of said loops and adjacent the rear of the housing;
a rectangular rear panel extending between said first and second loops and secured to said first and second cross members, said rear panel lying in a plane forwardly of the plane defined by the first arms of said loops and having opposite ends at an angle to the plane of said panel and extending rearwardly toward said first arms;
said housing further including rectangular side panels, one of said side panels extending between the first and second legs of each loop and each having a hook shaped end engageable respectively over the rearwardly extending ends of said rear panel to maintain the rear edge of the side panel against movement outwardly of the housing; and
means carried by said frame adjacent the opposite end of said side panel to secure said opposite end to said housing.

7. A fabricated frame comprising: a first fabricated loop;
a second fabricated loop spaced from said first loop, said loops each having first and second spaced apart legs and first and second arms extending between said legs;
frame means extending between said loops to rigidly maintain said loops in spaced relation to each other with the arms and legs of the first loop aligned with the arms and legs of the second loop, said means comprising, first cross member means extending transversely of said loops and secured thereto adjacent the first arm of each loop, and second cross member means extending transversely of said loops and secured thereto at a location spaced from said first cross member means, said first and second cross member means each comprising, a first cross member secured to the first leg of each of said loops, and a second cross member secured to the second leg of each of said loops, said first cross members of said first and second cross member means forming opposite legs of a third loop and said second cross members of said first and second cross member means forming opposite legs of a fourth loop, said third loop further including side legs extending respectively along the first legs of said first and second loops and secured thereto, and said fourth loop further including side legs extending respectively along the second legs of said loops and secured thereto; and wherein said third and fourth loops are each formed from a single strip of corrugated material, at least the inner corrugations of which present plane faces to facilitate mounting components thereon.

8. A frame according to claim 7 wherein the innermost corrugations of the portions of the third and fourth loops which extend along the first and second legs of the first and second loops extend slightly inwardly of the inside edges of the legs.

9. A fabricated instrument housing comprising:
  a first rectangular fabricated metal loop, said loop including a first leg, a second leg opposing said first leg, a first arm extending between and connecting the legs at one end and a second arm extending between and connecting the legs at the other end;
  a second fabricated metal loop including a first leg, a second leg opposing said first leg, a first arm extending between one end of the leg and a second arm extending between the other end of the legs, said second loop being in generally spaced parallel relation to said first loop with the respective legs and arms of each loop coplanar with each other;
  a third rectangular metal loop extending between said first and second loops, said third rectangular loop having sides extending along the first legs of each of said first and second loops and secured thereto; and
  a fourth rectangular loop extending between said first and second loops, said fourth rectangular loop having sides extending along said second legs of said first and second legs of said first and second loops and secured thereto; and
  wherein said third loob is an integral strip of corrugated metal; and said fourth loop is an integral strip of corrugated metal.

10. A housing according to claim 9 wherein one arm, one leg and at least one additional one of the remaining arms and legs of said first loop are integral with each other and are formed from a single strip of bendable metal, and one arm, one leg and at least one additional one of the remaining arms and legs of said second loop are integral with each other and are formed from a single strip of bendable metal.

11. A housing according to claim 10 wherein the corrugations of said third and fourth loops comprise a plurality of coplanar outer portions and a plurality of coplanar inner portions, said inner and outer portions being joined by short connecting portions extending between the ends of the inner and outer portions.

References Cited

UNITED STATES PATENTS

| | | | |
|---|---|---|---|
| 2,411,528 | 11/1946 | Dodington | 317—117 XR |
| 2,730,421 | 1/1956 | Burst et al. | 312—213 |
| 2,967,078 | 1/1961 | Stillman | 312—111 |
| 3,073,476 | 1/1963 | Heacock | 220—4 |

FOREIGN PATENTS

| | | |
|---|---|---|
| 960,444 | 6/1964 | Great Britain. |

CASMIR A. NUNBERG, Primary Examiner

U.S. Cl. X.R.

312—213, 111, 257

Disclaimer and Dedication

3,506,322.—*William Richards*, Medway, Mass. FABRICATED FRAME AND HOUSING. Patent dated Apr. 14, 1970. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]